(12) United States Patent
Slechta

(10) Patent No.: US 6,453,272 B1
(45) Date of Patent: Sep. 17, 2002

(54) SPURIOUS NOISE FILTER

(75) Inventor: William Slechta, North Attleboro, MA (US)

(73) Assignee: The Foxboro Company, Foxboro, MA (US)

( * ) Notice: Subject to any disclaimer, the term of this patent is extended or adjusted under 35 U.S.C. 154(b) by 0 days.

(21) Appl. No.: 09/514,110

(22) Filed: Feb. 28, 2000

(51) Int. Cl.$^7$ ................................................ H04B 15/00
(52) U.S. Cl. ...................... 702/190; 73/861.12; 364/574
(58) Field of Search ............................. 702/45, 47, 50, 702/57, 64, 69, 100, 106, 104, 111, 114, 115, 124, 183, 189, 190, 191, 193, 194, 195, 197; 73/861.11, 861.12, 861.08; 361/143; 364/510, 571, 574; 328/165

(56) References Cited

U.S. PATENT DOCUMENTS

| | | | |
|---|---|---|---|
| 4,370,892 A | * | 2/1983 | Schmoock ................ 73/861.12 |
| 4,587,620 A | * | 5/1986 | Niimi et al. ................ 702/193 |
| 6,014,902 A | * | 1/2000 | Lewis et al. ............. 73/861.12 |

FOREIGN PATENT DOCUMENTS

EP   0 915 324 A2   12/1999

* cited by examiner

*Primary Examiner*—John S. Hilten
*Assistant Examiner*—Xiuqin Sun
(74) *Attorney, Agent, or Firm*—Kevin A. Oliver; Foley Hoag LLP

(57) ABSTRACT

According to the principles of the invention, there is provided a system that identifies spurious noise values in an input signal and replaces them with substitute values representative of the spurious-noise-free signal. The system is activated when the signal deviation exceeds a predetermined threshold, otherwise passing the signal unchanged. The substituted representative values are determined based on historical signal data, preferably a moving average with a fixed window. There is further provided a maximum glitch width which prevents inadvertent suppression of a true step in the input signal, and a relaxation time which prevents consecutive filter activations from unduly masking the input signal.

17 Claims, 3 Drawing Sheets

SPURIOUS NOISE FILTER

BACKGROUND OF THE INVENTION

1. Field of the Invention

This application relates to the field of filters and more particularly to the field of spurious noise filters for use with magnetic flowmeters.

2. Description of Related Art

Magnetic flowmeters measure the rate of flow of a process fluid through a tube. They operate by detecting small voltage changes induced in a conductive fluid as it passes through a magnetic field imposed by energizing coils mounted on the tube. The induced voltage is proportional to the average velocity of the fluid and to the strength of the imposed magnetic field. Magnetic flowmeters are particularly applicable to monitoring fluids that present difficult handling problems for other metering systems, such as pulp, paste, and slurries.

Because magnetic flowmeter systems operate on small induced voltages, sensor readings are typically amplified and conditioned before presentation to subsequent processing, with an attendant degradation in signal-to-noise ratio. This situation is worsened by the non-homogeneity of some fluids, such as a slurry, for which solid pieces of material suspended in the fluid may come into direct contact with measurement electrodes. Since the solid pieces may be charged, or have a different conductivity than the surrounding fluid, their contact with measurement electrodes can cause spurious noise or "glitches" in measurements, which are not indicative of changes in fluid flow rate.

Glitches are particularly troublesome when the measurement signal is being used in a control process, and may result in inappropriate (and expensive) process interruptions. Known filtering methods apply low pass techniques to reduce the effects of these glitches. In particular a low pass filter, either digitally synthesized or analog, has an attenuated response to an impulse. However, as a significant disadvantage, the response is also extended in duration. The filter may also introduce undesirable delay into measurements for control applications.

There remains a need for a filter that suppresses spurious noise such as input glitches without introducing artifacts of conventional low-pass filters.

SUMMARY OF THE INVENTION

According to the principles of the invention, there is provided a system that identifies spurious noise values in an input signal and replaces them with substitute values representative of the spurious-noise-free signal. The system is activated when the signal deviation exceeds a predetermined threshold, otherwise passing the signal unchanged. The substituted representative values are determined based on historical signal data, preferably a moving average with a fixed window. There is further provided a maximum glitch width which prevents inadvertent suppression of a true step in the input signal, and a relaxation time which prevents consecutive filter activations from unduly masking the input signal.

In one aspect, a method for filtering a process sensor signal according to the principles of the invention includes: determining a spurious noise threshold; receiving a process sensor signal; determining a representative value of the process sensor signal; and replacing the process sensor signal with the representative value when a calculated value of the process sensor signal exceeds the spurious noise threshold, thereby providing a processed signal.

In this aspect, the process sensor signal may be a magnetic flowmeter signal indicative of a voltage potential between two electrodes disposed on the interior of a tube. The method may further include using the processed signal to control a flow rate of a fluid flowing through the tube. The representative value may be a moving average of the process sensor signal, the moving average calculated from a plurality of discrete process sensor signal measurements.

The spurious noise threshold may include a dynamic threshold and a minimum threshold, the dynamic threshold varying over time in response to variations of the process sensor signal, and the minimum threshold establishing a floor beneath which the dynamic threshold may not fall. The method may include determining a relaxation time during which the process sensor signal is not replaced with the representative value even when the calculated value of the process sensor signal exceeds the spurious noise threshold. The method may further include setting a spurious noise timer to prevent the process sensor signal from being replaced with the representative value for more than a predetermined amount of time.

In another aspect, a system for filtering a signal according to the principles of the invention includes: means for determining a spurious noise threshold; means for receiving a process sensor signal; means for determining a representative value of the process sensor signal; and means for replacing the process sensor signal with the representative value when a calculated value of the process sensor signal exceeds the spurious noise threshold, thereby providing a processed signal.

In this aspect, the process sensor signal may be a magnetic flowmeter signal. The system may further include means for using the processed signal to control a flow rate. The representative value may be a moving average of the process sensor signal. The spurious noise threshold may include a dynamic threshold and a minimum threshold. The system may further include means for determining a relaxation time during which the process sensor signal is not replaced with the representative value even when the calculated value of the process sensor signal exceeds the spurious noise threshold. The system may include means for setting a spurious noise timer to prevent the process sensor signal from being replaced with the representative value for more than a predetermined amount of time.

In another aspect, a computer program product for filtering a signal according to the principles of the invention includes: machine executable code to determine a spurious noise threshold; machine executable code to receive a process sensor signal; machine executable code to determine a representative value of the process sensor signal; and machine executable code to replace the process sensor signal with the representative value when a calculated value of the process sensor signal exceeds the spurious noise threshold, thereby providing a processed signal.

In this aspect, the process sensor signal may be a magnetic flowmeter signal. The computer program product may include machine executable code to use the processed signal to control a flow rate. The representative value may be a moving average of the process sensor signal. The spurious noise threshold may include a dynamic threshold and a minimum threshold. The computer program product may further include machine executable code to determine a relaxation time during which the process sensor signal is not replaced with the representative value even when the calculated value of the process sensor signal exceeds the spurious noise threshold. The computer program product may further include machine executable code to set a spurious noise timer to prevent the process sensor signal from being replaced with the representative value for more than a predetermined amount of time.

In another aspect, a magnetic flowmeter system according to the principles of the invention includes: a tube having an outside wall and an inside wall; a plurality of magnetic coils around the outside wall of the tube; a pair of electrodes on the inside wall of the tube; a processor electrically connected to the plurality of magnetic coils and the pair of electrodes, the processor configured to periodically energize the plurality of magnetic coils, and further configured to periodically measure a voltage potential between the pair of electrodes; the processor further configured to provide a filtered signal, the filtered signal being generated by replacing the voltage potential with a synthesized voltage potential each time that a voltage deviation exceeds a spurious noise threshold; and the processor further configured to calculate a flow rate through the tube using the filtered signal.

In this aspect, the processor may be further configured to use the flow rate to control a process. The synthesized voltage potential may be a moving average of the voltage potential, the moving average calculated from a plurality of discrete voltage potential measurements. The spurious noise threshold may include a dynamic threshold and a minimum threshold, the dynamic threshold varying over time in response to variations of the voltage potential, and the minimum threshold establishing a floor beneath which the dynamic threshold may not fall. The processor may be further configured to determine a relaxation time during which the voltage potential is not replaced with the synthesized voltage potential even when the voltage deviation exceeds the spurious noise threshold. The processor may be further configured to set a spurious noise timer to prevent the voltage potential from being replaced with the synthesized voltage potential for more than a predetermined amount of time. The processor may be further configured to prevent the voltage potential from being replaced with the synthesized voltage potential when a coil current deviation exceeds a predetermined coil deviation threshold.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a system and method for filtering raw measurements from a magnetic flowmeter. However, it will be understood by those of ordinary skill in the art that the methods and systems described herein can be suitably adapted to any filtering system used in process control or monitoring. The principles of the invention are particularly applicable to digital filtering systems that receive raw signals having noise characterized by brief, large excursions from a true value.

Figure 1:
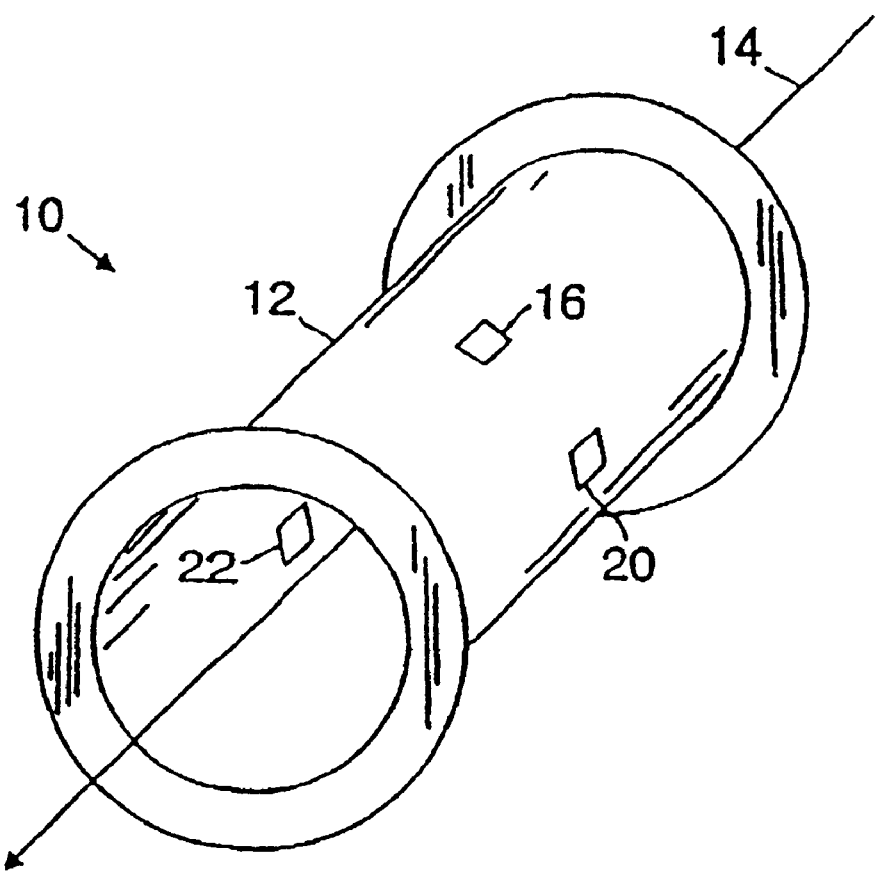
FIG. 1 is a schematic perspective view of a programmable magnetic flowmeter according to the present invention.

FIG. 1 is a schematic perspective view of a programmable magnetic flowmeter according to the present invention. A programmable magnetic flowmeter 10 has a tube 12 for supporting fluid flow along a longitudinal axis 14. A fluid (not shown), which may be a liquid, pulp, paste, slurry, or other process fluid, travels through the tube 12. A pair of magnetic coils 16, 18 mounted on opposite sides of the tube create a magnetic field perpendicular to the axis 14. A pair of electrodes 20, 22 are disposed on opposite sides of the interior of the tube 12, along a line perpendicular to the axis 14 and the magnetic field.

Figure 2:
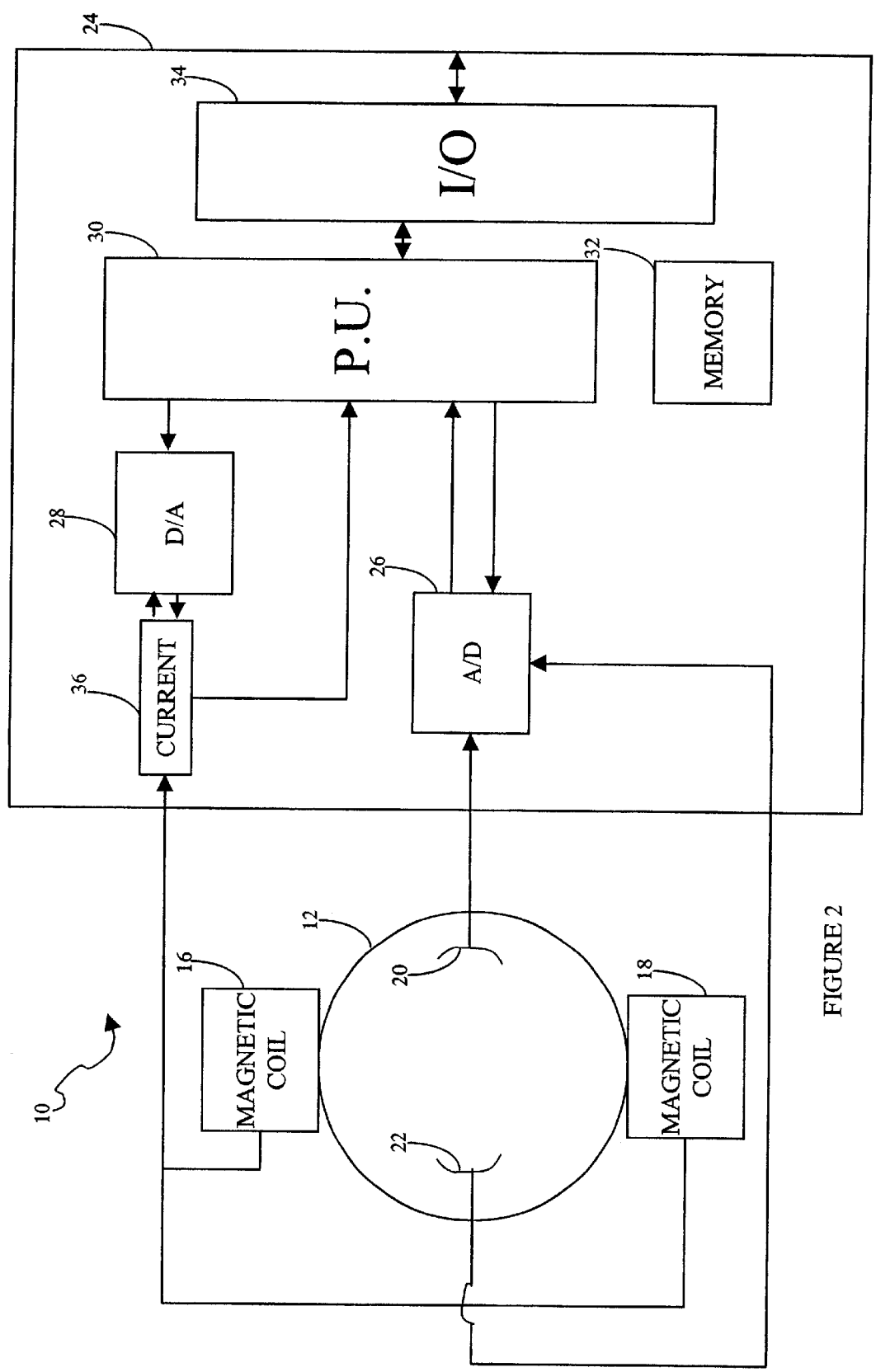
FIG. 2 is a block diagram of a programmable magnetic flowmeter according to the present invention.

FIG. 2 is a block diagram of the magnetic flowmeter 10 according to the present invention. As shown in FIG. 2, the magnetic coils 16, 18 and the electrodes 20, 22 are each connected to a processor 24 that controls the current through the coils 16, 18 and converts the output of the electrodes 20, 22 to a flow rate measurement, as well as performing other functions. Further details of an embodiment of a magnetic flowmeter as described above may be found in European Patent Application No. EP O 915 324 A2, the teachings of which are incorporated herein by reference.

The processor 24 includes an analog-to-digital ("A/D") converter 26, a digital-to-analog ("D/A") converter 28, a processing unit 30, a memory 32, and an input-output (I/O) converts these control signals into "drive signals," the coil currents which drive the magnetic coils 16, 18. The drive signals are typically alternating current ("AC") signals or pulsed direct current ("DC") signals. The drive signals may be closely regulated at an output of the D/A converter 28, so that the control signals from the processing unit 30 correlate to the actual drive signal. In a "free-running" mode, the drive signals are not closely regulated. In the free-running mode, the processing unit 24 includes a current sensor 36 which measures output current from the D/A converter 28 and provides an output current measurement signal, preferably a digital signal, to the processing unit 30. The processing unit 30 may use the output current measurement signal to calculate flow rates.

The A/D converter 26 receives voltages from the electrodes 20, 22 and converts them to a digital representation of a voltage potential between the electrodes 20, 22. The digital representation is periodically updated and transmitted to the processing unit 30. The periodic interval may be, for example, once every fifty milliseconds. The A/D converter 26 may also include pre-processing circuitry such as buffers, gain stages, and instrumentation amplifiers.

The processor 24 also includes a memory 32 connected to the processing unit 30 that stores data and programs. The processing unit 30 is further connected to an I/O unit 34 that provides an interface to external devices such as a mass storage device, display, keyboard, or a separate computer that provides program information to and receives data from the processor 24. The I/O unit 34 may include analog and/or digital interfaces for receiving and transmitting process control or monitoring signals, such as a 4–20 milliamp current source, a 0–10 volt voltage source, or a voltage meter. The I/O unit 34 may instead, or additionally, include various commercially available interfaces such as Fox-Comm or HART, available from The Foxboro Company, or the Profibus or the Foundation Fieldbus, available from SISCO, Inc. The processor 24 may execute instructions to control and measure coil currents, measure electrode voltages, and perform calculations, including digitally synthesized filtering, to determine flow rates in the tube 12. The calculated flow rates may be stored in the memory 32, or transmitted to the I/O unit 34 for external storage or display. Calculated flow rates may be used in a control system that, for example, reports the flow rate to other processes, monitors the flow rate for interrupt conditions such as tube emptying, or regulates the flow rate.

It will be appreciated that a number of techniques are known for implementing the processor 24 described above. All of the functions, except for analog/digital and digital/analog conversion, may be accomplished with software executing on a microprocessor in a computer, or on a microcontroller or programmable digital signal processor in an embedded system. The processor 24 may be integrated in its entirety into an application-specific integrated circuit, programmable gate array, programmable logic device, or other system-on-a-chip design. Or the processor 24 may be constructed from various commercially available discrete components including A/D converters, D/A converters, random access memories ("RAM's"), and processors. Any of the above devices may be adapted to operate according to the system described herein.

Figure 3:
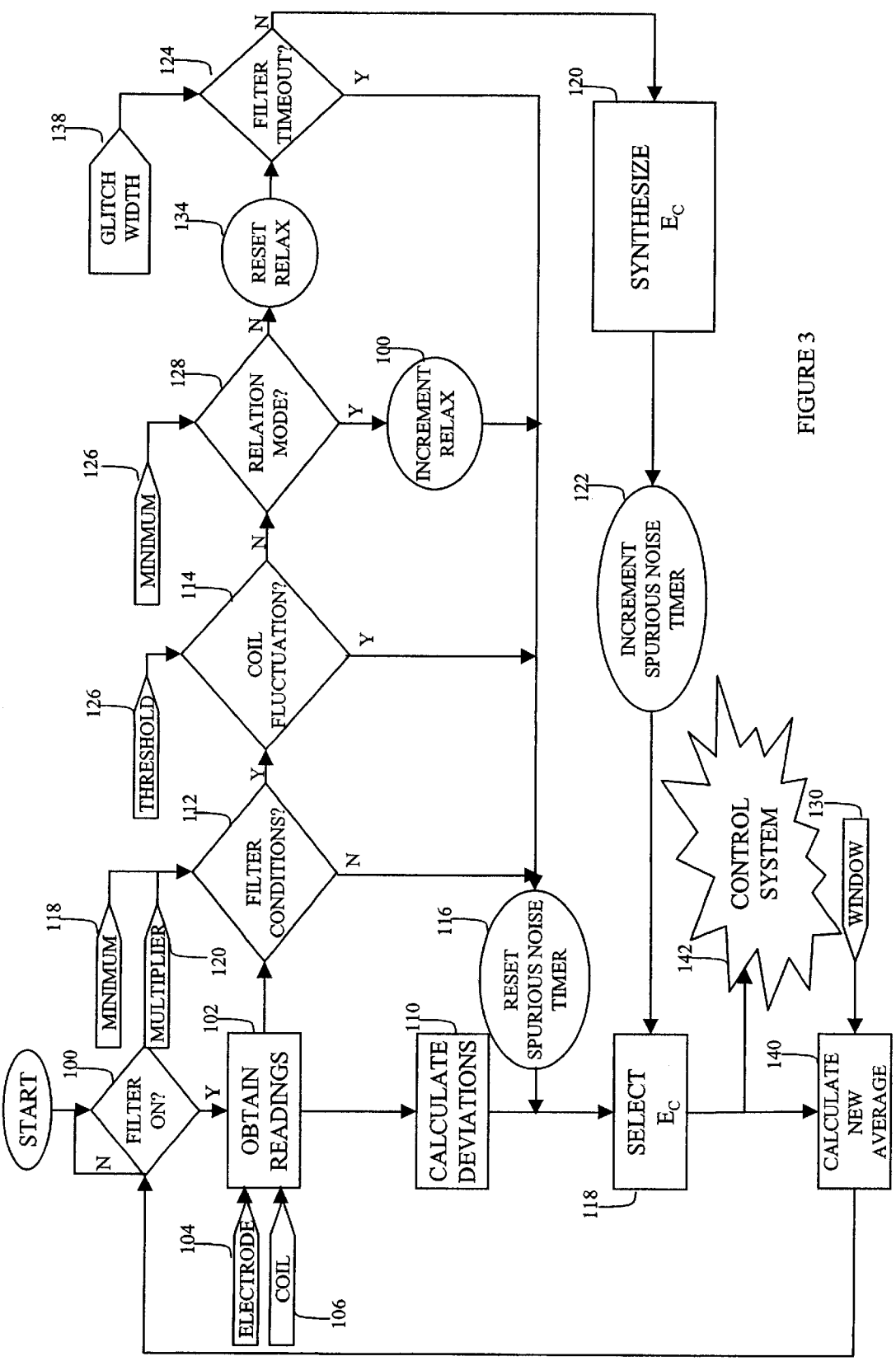
FIG. 3 is a flow chart of the operation of a spurious noise filter according to the principles of the invention.

FIG. 3 is a flow chart of the operation of a spurious noise filter according to the principles of the invention. The steps detailed in FIG. 3 may be readily transformed into software, or mixed hardware/software signal processing forms for use in a magnetic flowmeter system.

The process starts by determining whether the spurious noise filter is on, as shown in step 100. A magnetic flowmeter system may operate without the spurious noise filter. Thus filter activation is explicitly shown here. It will be appreciated that the filter may likewise be de-activated at any time under user control.

In step 102, process sensor signal readings are obtained from a coil 104 and an electrode 106. Each reading 104, 106 is a time-wise discrete measurement, preferably taken at a fixed, known interval. It will be appreciated by those skilled in the art, and further by reference to FIGS. 1 and 2, that these process sensor signals 104, 106, shown in FIG. 3 as single-ended inputs, each typically include at least two components. The signal from the electrode 106 includes two separate voltage measurements, from which a single potential difference is calculated. This difference may be pre-processed using, for example, analog or digital low-pass filtering, amplification, and other known signal processing or data acquisition techniques. Similarly, the signal from the coil 104 is formed from two different coil currents through two different coils, which are preferably pre-processed prior to use in the spurious noise filter. Some magnetic flowmeter applications have tightly regulated output of coil currents, under which conditions the output coil current, as specified by the processor 24, may be used directly for subsequent calculations. Any of these signals or other pre-processed signals, may be used as the process sensor signals of step 102.

In step 110, deviations are calculated for a reading from the electrode 106. An electrode average deviation is found by subtracting the electrode value 106 obtained in step 102 from an electrode average (determined in step 140, below). Additionally, an electrode current deviation is found by subtracting the electrode value 106 obtained in step 102 from the previous electrode value.

In step 112, the electrode average deviation and the electrode current deviation are examined for filter conditions. In this step, the electrode average deviation is compared to a spurious noise threshold. If the electrode average deviation exceeds the spurious noise threshold, then the system proceeds to step 114. If the electrode average deviation does not exceed the spurious noise threshold, then the electrode current deviation is tested. If the electrode current deviation exceeds the spurious noise threshold, then the system proceeds to step 114. If the electrode current deviation does not exceed the spurious noise threshold, then a spurious noise timer is reset 116 and the system proceeds to step 118 where an electrode value is selected. As will become clear in the following description, the electrode value selection 118 involves choosing between an unprocessed electrode reading 106 or, if the filter is active, a synthesized electrode value.

The spurious noise timer limits the duration of filter operation. After each calculation of a synthesized electrode value, as shown in step 120, the spurious noise timer is incremented 122. This enables filter timeout determinations to be made, as shown in step 124, and explained in more detail below. It will be appreciated that the spurious noise timer may be implemented, for example, as a software counter or as a real-time clock. It will be further appreciated that the spurious noise timer need not be reset every time that step 112 results in a non-activation of the filter, provided that spurious noise timer can be applied to properly limit the use of synthesized electrode values.

The spurious noise threshold is a dynamic value which may change with each iteration of the filter. Two user controlled values are provided to determine the spurious noise threshold: a minimum 118 and a multiplier 120. The minimum 118 establishes a floor below which the spurious noise threshold cannot drop, preferably two percent of the full-scale value of the electrode 106. The multiplier 120 is multiplied by a damped deviation value to provide the (time-varying) spurious noise threshold, subject to the minimum 118. The damped deviation value may be determined based on, for example, weighted previous electrode deviation values, with weights for all included previous electrode deviation values summing to one. In one embodiment, the damped deviation value is equal to a first weight times a previous electrode current deviation, plus a second weight times the electrode current deviation. In this embodiment, the first weight and the second weight are preferably selected to provide an effective rise time, or damping time, of eight seconds. Other combinations may be desired for different applications. The spurious noise threshold, as determined by either the minimum 118 or the product of the multiplier 120 and the damped deviation value, is used to test for filter activation.

As noted above, If the electrode current deviation or the electrode average deviation exceeds the spurious noise threshold, then the system proceeds to step 114 where coil fluctuations are examined. In a preferred embodiment, the filter is not activated when there are substantial coil fluctuations, since coil fluctuations will result in proportional electrode fluctuations for a properly functioning magnetic flowmeter. To test for coil fluctuations, a coil difference is determined between the current coil reading 104 and a previous coil reading. If this coil difference does not exceed a user-controlled threshold 126, then no further calculations are required and the system may proceed directly to step 128. If the coil difference does exceed the user-controlled threshold 126, then further calculations are performed. First, a coil percent shift is calculated by subtracting the coil reading 104 from a previous coil reading, and dividing this quantity by the previous coil reading. Then, an electrode percent shift is calculated by dividing the current electrode reading 106 by the electrode average (determined in step 140, below). Next a ratio is formed by dividing the coil percent shift by the electrode percent shift. If this ratio exceed a predetermined range, preferably 0.75 to 1.25, then the change in the electrode reading 106 may be in part attributed to coil fluctuations, so the system proceeds to step 118.

Additional tests for coil stability may be used. In one test, a coil bin average may be used separately. The coil bin average is preferably a moving average of historical coil readings using, for example, the same user-controlled window 130 that is used to calculate the electrode bin average. If the current coil reading 104 varies by more than two percent from the coil bin average, then the system proceeds to step 118. Similarly, if the coil percent shift described above varies by more than, for example, two percent, regardless of the ratio, the system may proceed directly to step 118.

In step 128, the relaxation mode is checked. In order to prevent consecutive filter activations from masking a true change in the flow rate being measured, a relaxation period is included during which the filter may not be re-activated. This timer operation uses a relaxation timer increment 132 and a relaxation timer reset 134. If the relaxation timer exceeds a user-controlled minimum 136, then non-relaxation operation may proceed, so the relaxation timer is reset 134, and the system proceeds to step 124. If the relaxation timer is running but it has not exceeded the user-controlled minimum 136, then the relaxation timer is incremented 132 and the system proceeds to step 118.

In step 124, the system tests for a filter timeout. If the filter has been active for an excessive period of time, as measured by the spurious noise timer, then the spurious noise timer is reset 116 and the system proceeds to step 118. In making this determination, the spurious noise timer is compared to a user-controlled spurious noise width 138.

In step 120, the system synthesizes a value for the electrode. This value is preferably the moving average calculated in step 140, but may be a different value representative of several previous electrode values, such as a median, weighted average, or linear extrapolation.

In step 118, an electrode value is selected. In this step, the actual electrode value 106 obtained in step 102, and a synthesized electrode value calculated in step 120 are received. If a new value for the electrode has been synthesized in step 120, then this value is used as the current value. If no value has been synthesized, then the actual electrode value 106 is used. Whether a value has been synthesized for a particular iteration may be determined, for example, by setting a flag when the spurious noise timer is reset 116, or by resetting the synthesized electrode value to zero each time readings are obtained in step 102. In this manner, the synthesized electrode value is used whenever the most recent electrode reading appears inconsistent with previous values (as determined in step 112).

Following the selection of an electrode value, the system proceeds to step 140 where a new average is calculated. The new average, using the value selected in step 118, is preferably a moving average with a user-controllable window 130, but may be any other representative value of the unprocessed electrode value signal. The window 130 determines the number of previous values that are used, in addition to the current electrode value, when calculating an average. Once a new average has been calculated, the system returns to step 102, and new readings are obtained for the electrode 106 and the coil 104.

The electrode value selected in step 118, whether actual or synthesized; may be used to operate a control system 142. The control system 142 may use the electrode value, and corresponding coil current values, to calculate the flow through a magnetic flowmeter tube. This value might be used in turn to regulate flow through the tube, to monitor flow through the tube, or to provide an alert signal when, for example, the tube is empty. It should be appreciated that the order of the above steps may be varied consistent with the principles of the invention. For example, the test for filter timeout 124 may occur before the test for relaxation mode 128.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for filtering a process sensor signal comprising:

determining a spurious noise threshold;

receiving a process sensor signal;

determining a representative value of the process sensor signal; and replacing the process sensor signal with the representative value when a calculated value of the process sensor signal exceeds the spurious noise threshold, thereby providing a processed signal, wherein the spurious noise threshold includes a dynamic threshold and a minimum threshold, the dynamic threshold varying over time in response to variations of the process sensor signal, and the minimum threshold establishing a floor beneath which the dynamic threshold may not fall.

2. The method of claim 1 wherein the process sensor signal is a magnetic flowmeter signal indicative of a voltage potential between two electrodes disposed on the interior of a tube.

3. The method of claim 2 further comprising using the processed signal to control a flow rate of a fluid flowing through the tube.

4. The method of claim 1 wherein the representative value comprises a moving average of the process sensor signal, the moving average calculated from a plurality of discrete process sensor signal measurements.

5. The method of claim 1 further comprising determining a relaxation time during which the process sensor signal is not replaced with the representative value even when the calculated value of the process sensor signal exceeds the spurious noise threshold.

6. The method of claim 1 further comprising setting a spurious noise timer to prevent the process sensor signal from being replaced with the representative value for more than a predetermined amount of time.

7. A system for filtering a signal comprising:

means for determining a spurious noise threshold;

means for receiving a process sensor signal;

means for determining a representative value of the process sensor signal; and means for replacing the process sensor signal with the representative value when a calculated value of the process sensor signal exceeds the spurious noise threshold, thereby providing a processed signal, wherein the process sensor signal is a magnetic flowmeter signal and wherein the spurious noise threshold includes a dynamic threshold and a minimum threshold.

8. The system of claim 7 further comprising means for using the processed signal to control a flow rate.

9. The system of claim 7 wherein the representative value comprises a moving average of the process sensor signal.

10. The system of claim 7 further comprising means for determining a relaxation time during which the process sensor signal is not replaced with the representative value even when the calculated value of the process sensor signal exceeds the spurious noise threshold.

11. The system of claim 7 further comprising means for setting a spurious noise timer to prevent the process sensor signal from being replaced with the representative value for more than a predetermined amount of time.

12. A computer program product for filtering a signal comprising:

machine executable code to determine a spurious noise threshold;

machine executable code to receive a process sensor signal;

machine executable code to determine a representative value of the process sensor signal; and machine executable code to replace the process sensor signal with the representative value when a calculated value of the process sensor signal exceeds the spurious noise threshold, thereby providing a processed signal, wherein the spurious noise threshold includes a dynamic threshold and a minimum threshold.

13. The computer program product of claim 12 wherein the process sensor signal is a magnetic flowmeter signal.

14. The computer program product of claim 13 further comprising machine executable code to use the processed signal to control a flow rate.

15. The computer program product of claim 12 wherein the representative value comprises a moving average of the process sensor signal.

16. The computer program product of claim 12 further comprising machine executable code to determine a relaxation time during which the process sensor signal is not replaced with the representative value even when the calculated value of the process sensor signal exceeds the spurious noise threshold.

17. The computer program product of claim 12 further comprising machine executable code to set a spurious noise timer to prevent the process sensor signal from being replaced with the representative value for more than a predetermined amount of time.

* * * * *